Oct. 4, 1955     L. V. ANDERSON ET AL     2,719,704
CHEMICAL MIXING NOZZLE AND WATER SHUT-OFF VALVE
Filed Dec. 20, 1954
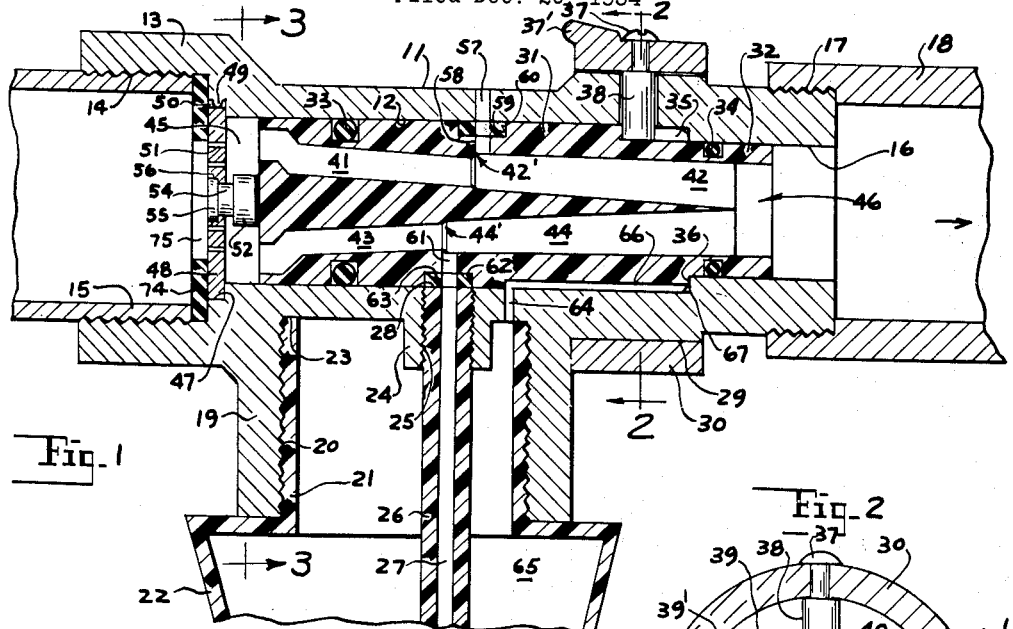
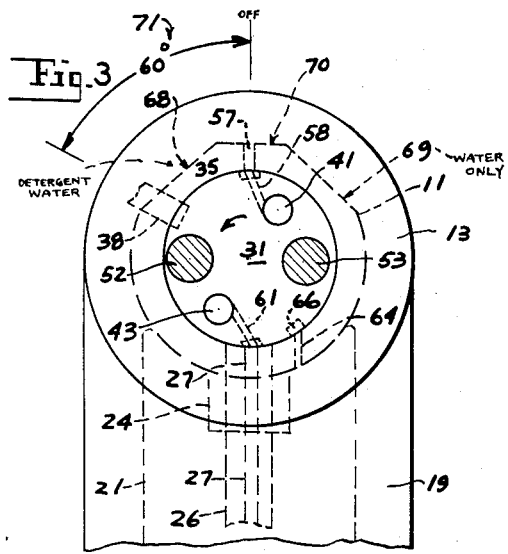
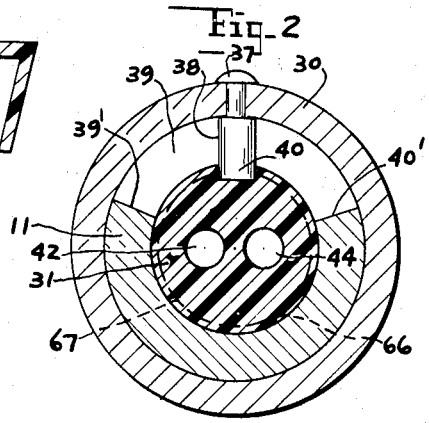
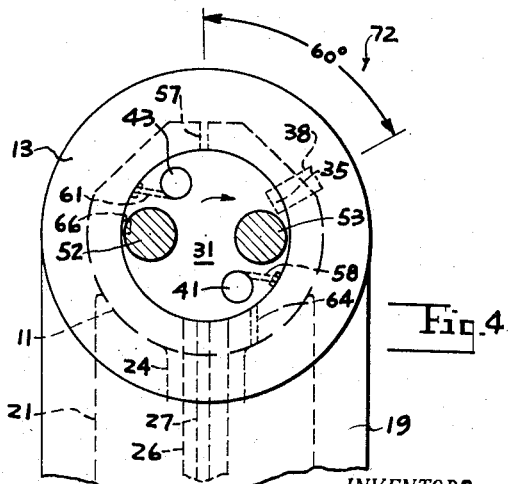
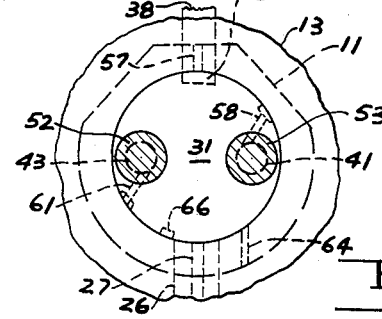
INVENTORS.
LESLIE V. ANDERSON.
BY EDWARD KOLODZIEJ.
TED TARGOSH.
Robert A. Sloman
ATTORNEY.

United States Patent Office 2,719,704
Patented Oct. 4, 1955

2,719,704

CHEMICAL MIXING NOZZLE AND WATER SHUT-OFF VALVE

Leslie V. Anderson, Detroit, Ted Targosh, Hamtramck, and Edward Kolodziej, Hazel Park, Mich.

Application December 20, 1954, Serial No. 476,482

22 Claims. (Cl. 261—18)

This invention relates to a chemical mixing nozzle and water shut-off valve, and more particularly to a device for utilizing pressure fluid moving through a venturi construction for obtaining a mixture of fluid and chemical when the valve element is rotated to a predetermined position.

This application is a continuation in part of copending patent applications, Serial #357,734, filed May 27, 1953, now abandoned, Serial #362,786 filed June 19, 1953, and Serial #443,796 filed July 16, 1954.

It is the object of the present invention to provide a novel chemical mixing nozzle and water shut-off valve construction within a casing to which fluid under pressure such as water may be supplied, said casing being also connected with a container of chemicals sought to be mixed with the water or other fluid whereby, with the valve mechanism properly set, there will be delivered a fluid mixture through the outlet of the casing.

It is the further object of the present invention to provide a rotary valve construction within the valve casing which will have at least three positions of adjustment, namely, a shut-off position wherein there will be no flow through the valve casing, another position where the fluid will flow through the valve casing and effect a mixing with chemical, and still another position where fluid will flow through the casing without any mixing.

It is the further object of the present invention to provide a mixing nozzle and water shut-off valve construction with a manually operated dial control upon the exterior of the casing for effecting predetermined rotary adjustments of the valve element for determining the type of flow through the said valve casing as above described.

It is the further object of the present invention to provide a valve construction which is effectively sealed to prevent leakage.

These and other objects will be seen from the following specification and claims in conjunction with the appended drawing, in which:

Fig. 1 is an elevational section of the mixing nozzle and valve with inlet and outlet conduits and chemical container attached thereto being fragmentarily shown.

Fig. 2 is a section taken on line 2—2 of Fig. 1. However, for illustration, the valve element in Fig. 1 has been rotated to a position corresponding to Fig. 3 to better illustrate the construction of the valve element.

Fig. 3 is a fragmentary section taken on line 3—3 of Fig. 1 illustrating the relation of the valve element to the valves in the chemical mixing position shown in Fig. 1.

Fig. 4 is an illustration similar to that shown in Fig. 3, except that the valve element has been rotated 120 degrees; and Fig. 5 is a fragmentary view similar to Figs. 3 and 4, but illustrating the intermediate position of the valve element corresponding to Fig. 2, wherein there is no flow through the casing.

It will be understood that the above drawing illustrates merely a preferred embodiment of the invention, and that other embodiments are contemplated within the scope of the claims hereafter set forth.

Referring to the drawing, the present dial control mixing nozzle and water shut-off valve includes an elongated casing 11 having a cylindrical bore 12 which terminates at one end in the circularly-shaped inlet 13, being interiorly threaded at 14 to threadedly receive the male end of a fluid supply conduit 15 which is adapted for connection to a source of fluid under pressure such as water.

At the opposite end of said casing there is provided an elongated bore 16 of less diameter than bore 12, the outer end of which defines a fluid outlet. Said outlet is exteriorly threaded at 17 and it is adapted to threadedly engage the female end of a fluid delivery conduit fragmentarily indicated at 18.

Intermediate the ends of said casing there is provided a transversely arranged laterally directed inlet flange 19 which is interiorly threaded at 20 for threadedly receiving the elongated threaded outlet 21 of chemical container 22 which is fragmentarily shown, said outlet being adapted to snugly engage the casing as at 23, Fig. 1.

There is also formed through said casing a transverse chemical inlet passage which is interiorly threaded at 25 and is partially defined by the laterally projecting boss 24 upon the interior of inlet flange 19. Aspirating tube 26 with central passage 27 is positioned within said flange and threaded up into opening 25 for registry at its upper end with the exterior surface of valve element 31 as at 28. The opposite end of tube 26 projects down into the fluid or chemical within container 22, and normally would be adjacent the bottom of such container.

Casing 11 towards its outlet end has a cylindrical enlargement 29 over which is rotatively positioned and journalled a dial control ring 30 adapted to effect manual rotary movements of valve element 31 for operation in the manner hereafter described.

Valve element 31 is of cylindrical shape and is rotatively positioned within casing 11 inwardly of its inlet and outlet. Said bore, adjacent outlet 16, is formed at a reduced diameter defining the annular shoulder or valve seat 36. Valve element 31 has a correspondingly reduced end portion defining an annular shoulder which is registerable with said seat to thereby limit the inward positioning of said valve element within the bore of said casing.

Adjacent opposite ends of said valve element there are provided a pair of annular recesses within which are nested a pair of ring seals 33 and 34 adapted to cooperatively engage the internal bore of said casing to prevent leakage of fluid.

A portion of valve element 31 adjacent the aforementioned shoulder is provided with a short longitudinal slot 35 adapted to receive the lower end of transverse pin 38 as at 40, Fig. 2, which is joined by rivet 37 to the dial control ring 30.

As shown in Figs. 1 and 2, there is provided preferably a 120 degree arcuate transverse slot 39 which extends through the wall of casing 11 and which slidably receives pin 38 whereby, upon manual rotation of ring 30, the valve element 31 may be correspondingly rotated.

As shown in Fig. 2, slot 39 terminates at one end in the radial wall 39' and at its opposite end in the radial wall 40', each of which, respectively, are adapted to cooperatively engage the pin 38 serving as a stop for accurately positioning the valve element and the passages therethrough with respect to the poppet valves 52 and 53, hereafter described, and certain other registering passageways.

Formed throughout a portion of valve element 31 are a pair of slightly converging fluid conduits 41 and 43 which terminate intermediate the ends of said valve element in the venturi passages 42 and 44, respectively, which are of progressive increasing diameter towards the outer end of said valve element. At the junction of venturi 42, with conduit 41, there is an annular portion of slightly increased diameter 42' and similarly at the junction of venturi 44 and conduit 43 there is a portion of slightly increased diameter indicated at 44'.

Conduits 41 and 43 at the inner end of said valve element terminate in the annular chamber 45 within said casing which is bounded upon one side by the disc 48, nested within counterbore 47 of said casing, said disc having a series of transverse apertures 51 formed therethrough to permit the passage of pressure fluid. A peripheral notch 50 is formed in said disc and is adapted to cooperatively receive the depending key 49 upon the interior of said casing whereby said disc is retained against rotation to thus maintain the valves 52 and 53 mounted upon said disc in a fixed and predetermined position with respect to said casing.

The opposite or outer end of valve element 31 terminates in a mixing chamber 46 in communication with the outer ends of venturi passages 42 and 44.

Valves 52 and 53 are in the nature of poppet valves and are arranged in parallel spaced relation with their axes lying in a horizontal plane and are adapted for overlapping closing registry with the inlets of conduits 41 and 43 when the valve element 31 is rotated to the closed or central position shown in Figs. 2 and 5 to thereby block off any flow of pressure fluid through the said conduits.

Said valves include the cylindrical shanks 54 which are slidably and loosely positioned transversely through a pair of apertures formed in disc 48, said apertures being countersunk as at 56 for cooperatively and retainingly receiving the flanges 55 upon the outer ends of said valves, whereby said valves 52 and 53 are effectively retained with respect to said disc.

Transverse air inlet passage 57 is formed through the wall of casing 11 intermediate its ends and communicates with valve element 31, and in the position of valve element 31 shown in Figs. 1 and 3 is adapted for registry with a corresponding transverse air inlet opening 58 formed in said valve element, and with the interior end of said inlet opening communicating with venturi passage 42 as at point 42'. The outer portion of air inlet opening 58 has a circular enlargement 59 adapted to receive the centrally apertured disc-like seal 60, which cooperatively engages the bore of casing 11 as shown in Fig. 1.

There is provided in said valve element a transverse chemical inlet 61 the inner end of which communicates with the other venturi passage 44 as at 44'. The outer end of chemical inlet 61 has a circular enlargement 62 adapted to snugly receive the centrally apertured disc-like seal 63 which is adapted to cooperatively engage the bore of casing 12, and in the rotated position of the valve element of Fig. 1 or Fig. 3 cooperatively registers with the end 28 of aspirating tube 26 to thereby provide an effective seal and to prevent leakage.

In normal operation it is necessary that an air vent be provided for the interior chamber 65 of chemical container 22. For this purpose there is provided within casing 11 a transverse channel 64 which communicates with the interior of inlet flange 19 and at its inner end registers with the elongated slot 66 formed in the valve element. The portion of said valve element of greater exterior diameter and which registers with casing shoulder 36 is provided with an annular chamfer 67 which thereby provides an annular passageway in communication with slot 35 in said valve element. Thus there is established air communication through the arcuate slot 39 to the exterior of the casing whereby during normal operation, atmospheric air will be available to displace any chemical withdrawn from container 22.

Referring to Fig. 3, the casing 11 has the plane surface 68 on which is designated the word "chemical" or "detergent," and adjacent thereto the flat surface 70 has a designation such as "off." Similarly, an adjacent plane surface 69 will have a designation such as "water only."

These plane surfaces 68, 69 and 70, represent the three positions of rotated adjustment of pin 38 and the dial control ring 30, to thereby visibly indicate the exact positioning of the valve element.

For example, when the pointer 37' on said ring registers centrally with the central plane surface 70, there will be no flow of pressure fluid through the casing because the two conduits 41 and 43 will have been rotated to the position shown in Fig. 5 wherein the stationary valves 52 and 53 overlap and close off the said conduits. It will be noted in this connection that the central position of the pin 38 is indicated in dotted lines in Fig. 5 and, further, that in this closed position the air inlet 58 in the valve element is out of registry with the casing air inlet 57. Similarly, the chemical inlet 61 in the valve element is out of registry with the chemical inlet 27 forming a part of aspirating tube 26. Furthermore, the air vent slot 66 is out of registry with the air vent opening 64 into the chemical container 22. In view of this construction, as well as the ring seals 33 and 34, the said valve casing is completely sealed off, avoiding all leakage and all flow of fluid.

A second counterbore is formed within the inlet 13, adjacent counterbore 47, and of increased diameter, adapted to snugly receive the flexible sealing washer 74, centerally apertured at 75 to permit the passage of pressure fluid. The diameter of the aperture 75 in said washer is such that a portion of the said washer 74 operatively engages the flanges 55 upon the poppet valves 52 and 53 for normally biasing the same forwardly into substantial engagement with the corersponding end wall of valve element 31.

This central or closed position of the valve element 31 and the controlling dial ring 30 is designated in Fig. 5, and the arrow 73 pointed at opposite ends, Fig. 5, illustrates that the said valve element 31 may be rotated 60 degrees in a counterclockwise direction to the position 71 designated in Fig. 3, which position corresponds to the chemical mix position.

In this position the conduits 41 and 43 have been rotated out of alignment with the valves 52 and 53, as shown, and are thus free to receive pressure fluid flowing through conduit 15 and through the apertures 51 in the disc and into chamber 45.

This pressure fluid enters the venturi passages 42 and 44 and causes the aspiration or introduction of chemical from container 22 up through the aspirating tube 26 through passage 61 and into venturi passage 44 for delivering the same to the mixing chamber 46. This provides a means for utilizing the pressure of fluid such as water as it flows through the said venturi 42 and 44 to cause the withdrawal of predetermined amounts of chemical for mixing with the water or other fluid.

In order to effect an aeration of the mixture, provision is made for the introduction of air through the inlets 57 and 58, which, in the adjusted position of the valve element shown in Fig. 3, are in registry and communicate with venturi passage 42.

It is seen from Fig. 3 that conduit 41 connects air inlet 58 and registers with air inlet 57 in the casing. At the same time, chemical inlet 61 in the valve element joins at one end the conduit 43 at its juncture with the venturi passage 44, and at its opposite end registers with the chemical inlet 27. At the same time, the air vent conduit 64 in the casing registers with the air vent slot 66, which, as shown in Fig. 2, communicates with the atmosphere through the annular slot 67 formed in the valve element and which, of course, registers with slot 35 and, in turn, slot 39.

This is the only position of rotated adjustment where there will be a mixture of water and detergent or other chemical, and at the same time, this mixture will be aerated and delivered through mixing chamber 46, and through outlet conduit 18, Fig. 1. This position of adjustment 31 is obtained by rotating the ring 30 from the position shown in Fig. 2 or Fig. 5 to the position shown in Fig. 3, with the said pin 38 engaging the stop surface 40' at one end of the slot 39 in the casing.

To turn off the flow entirely it is only necessary to rotate the ring 30 through an arc of 60 degrees back to the central position shown in Figs. 2 and 5.

In operation, should it be desired to merely provide for the flow of fluid or water through the casing, such as for a rinsing operation, the ring is rotated an additional 60 degrees in a clockwise direction with the user facing inlet 13 in effect, whereby the valve element 31 is positioned as shown in Fig. 4 and as diagrammatically indicated by the dotted line positioning of pin 38 as it would engage the end wall 39' of slot 39.

In this position it will be noted that the conduits 41 and 43 are out of alignment with the valves 52 and 53 to thereby assure the flow of pressure fluid through the venturi passages 42 and 44 and directly through outlet 16 and outlet conduit 18. In this position of adjustment the chemical inlet passage 27 is out of alignment with the corresponding passageway 61 in said valve element which joins conduit 43. Furthermore, the air inlet 58 is clearly out of alignment with the casing inlet 57. And furthermore, the vent slot 66 is out of registry with the vent slot 64 in the casing. This means that all of the other registering passageways are closed off so there is nothing more than the flow of pressure fluid through the said casing.

In other words, the valve element has a central "off" position of Fig. 5, a chemical mixing position of Fig. 3, and a plain water or other fluid delivery position of Fig. 4. These positions of adjustment are controlled by the dial control ring 30 upon the exterior of the said casing and which is adapted for rotation manually by the operator, as desired.

In opertaion, it will be noted that the inner end of conduit 15 operatively and retainingly engages the rubber seal 74 within its counterbore in the said casing, which seal in turn biases the valve elements 52 and 53 closely against the end wall of valve element 31 to thereby provide an effective seal when the said valve is rotated to the position shown in Fig. 5.

Another advantage of the present invention resides in the fact that the valve element is easily removable from the casing for cleaning. All that is necessary is to apply pressure lengthwise of the valve element from the outlet side of the casing, and the said valve element slides out easily, carrying therewith washer 74 and disc 48.

As shown in Fig. 1, the two venturi passages 42 and 44 actually converge towards each other towards the outer end of valve element 31 at mixing chamber 46 to thereby produce a turbulent condition therein.

Passage 42 will be conducting aerated water or other fluid and passage 44 will be conducting a mixture of water or fluid and a chemical. As both independent streams will converge in the mixing chamber 46 in a state of turbulence, there will be produced an efficient mixing action to thereby deliver through outlet 16 and outlet 18 a homogeneous mixture.

The turbulent condition produced in the mixing chamber 46 and at the outlet 16 will provide for a spray pattern so that no other spray device is necessary for delivering the mixture in a spray condition through outlet 16. This mixture may be of a fertilizer or other chemical or of a detergent, or the like.

Because the venturi passages 42 and 44 are arranged at an angle, no choke is necessary for restricting the flow of water through passages 41 and 43.

Having described our invention, reference should now be had to the claims which follow for determining the scope thereof.

We claim:

1. A chemical mixing nozzle and water shut-off valve comprising an elongated casing with a cylindrical bore and having an inlet at one end adapted for connection to a source of fluid under pressure and having an outlet at its opposite end, a cylindrical valve element rotatably positioned within said bore inwardly of its inlet and outlet and having therein a pair of spaced fluid conduits extending from one end thereof and terminating intermediate the ends of said valve element in a pair of independent venturi passages communicating with said outlet, a transversely arranged apertured disc mounted within said casing at its inlet and spaced from said conduits, a pair of parallel spaced poppet valves loosely mounted upon said disc transversely thereof with their one ends adapted for overlapping sealing registry with the ends of said conduits, said valve element being rotatable to permit the flow of pressure fluid through said conduits, means mounted on said casing and joined to said valve element for rotating the same, an inlet flange projecting laterally from said casing intermediate its ends adapted to receive the outlet of a chemical container, there being a transverse inlet passage formed through the wall of said casing communicating with the interior of the inlet flange, an aspirating tube within said flange joined at one end to said inlet passage and with its opposite end adapted to extend down into the fluid in said chemical container, a transverse chemical inlet formed in said valve element communicating at one end with one of said venturi passages and at its opposite end adapted for registry with said inlet passage whereby upon the flow of pressure fluid through said venturi passages a mixture of water and chemical will be delivered to said casing outlet.

2. The mixing nozzle and valve of claim 1, said casing adjacent said inlet and outlet being interiorly and exteriorly threaded, respectively, to permit the connection of conduits thereto.

3. The mixing nozzle and valve of claim 1, said valve element being constructed of a chemically inert substance.

4. The mixing nozzle and valve of claim 1, said valve element being constructed of a plastic material.

5. The mixing nozzle and valve of claim 1, said bore adjacent said outlet being of reduced diameter defining an annular valve seat, said valve element having a correspondingly reduced end portion defining a shoulder registerable with said seat.

6. The mixing nozzle and valve of claim 1, said bore adjacent said outlet being of reduced diameter defining an annular valve seat, said valve element having a correspondingly reduced end portion defining a shoulder registerable with said seat, and a pair of annular seals nested within outer portions of said valve element adjacent its ends cooperative with said casing.

7. The mixing nozzle and valve of claim 1, said venturi passages at one end being slightly larger in diameter than the meeting ends of said conduits, and being of progressively increasing diameter towards their other ends, said venturi passages terminating in a fluid and chemical mixing chamber adjacent the end of said valve element.

8. The mixing nozzle and valve of claim 1, there being a peripheral notch in the edge of said disc, and a key depending from the bore of said casing nested in said notch to retain said disc against rotary movement.

9. The mixing nozzle and valve of claim 1, said casing having a counterbore at the end of said inlet for receiving said disc, there being a second counterbore of increased diameter within said inlet adjacent said first counterbore, and a centrally apertured flexible washer tightly nested in said second counterbore retainingly engaging said poppet valves into cooperative engagement with said valve element.

10. The mixing nozzle and valve of claim 1, said disc being transversely apertured to slidably receive said poppet valves, said latter apertures being countersunk, and annular flanges on the ends of said valves adapted to nest within said countersinks.

11. The mixing nozzle and valve of claim 1, said means for rotating said valve element including a cylindrical ring rotatably journaled upon said casing, said casing having a transversely arranged arcuate slot therethrough, and a radial pin joined at one end to said ring loosely mounted within said slot and at its other end joined to said valve element.

12. The mixing nozzle and valve of claim 1, said inlet flange being interiorly threaded to receive the neck of said chemical container.

13. The mixing nozzle and valve of claim 1, there being a radial boss within said inlet flange partially defining said inlet passage, said boss and inlet passage being interiorly threaded to threadedly receive said aspirating tube, the upper end of said tube registering with said valve element.

14. The mixing nozzle and valve of claim 1, said transverse chemical inlet in said valve element being enlarged at its outer end, and a centrally apertured sealing disc nested therein cooperatively engaging said aspirating tube.

15. The mixing nozzle and valve of claim 1, said chemical inlet in said casing being positioned at the junction of one of said venturi passages with its connecting conduit.

16. The mixing nozzle and valve of claim 1, there being a transverse air inlet passage formed in the wall of said casing communicating with said valve element, there being a transverse air inlet opening formed in said valve element communicating at one end with one of said venturi passages, and at its opposite end adapted for registry with said air inlet passage whereby the fluid and chemical mixture delivered at said outlet will be aerated.

17. The mixing nozzle and valve of claim 1, there being a transverse air inlet passage formed in the wall of said casing communicating with said valve element, there being a transverse air inlet opening formed in said valve element communicating at one end with one of said venturi passages, and at its opposite end adapted for registry with said air inlet passage whereby the fluid and chemical mixture delivered at said outlet will be aerated, said air inlet opening at its outer end having a circular enlargement adjacent said casing, and a centrally apertured sealing disc within said enlargement cooperatively engaging said casing.

18. The mixing nozzle and valve of claim 1, there being connected air vent passages formed in said casing and valve element communicating with the interior of said inlet flange.

19. The mixing nozzle and valve of claim 1, said valve element having a central position of adjustment whereby said valves block off said conduits, and additional positions of rotary adjustment in opposite directions from said central position which permit alternately delivery of a fluid mixture with a chemical at said outlet, or the delivery of fluid alone.

20. The mixing nozzle and valve of claim 1, there being a transverse air inlet passage formed in the wall of said casing communicating with said valve element, there being a transverse air inlet opening formed in said valve element communicating at one end with one of said venturi passages, and at its opposite end adapted for registry with said air inlet passage whereby the fluid and chemical mixture delivered at said outlet will be aerated, said valve element having a central position of adjustment whereby said valves block off said conduits, said second transverse inlet passage and said air inlet passage being, respectively, out of registry with said channel inlet and air inlet in said valve element.

21. The mixing nozzle and valve of claim 1, said means for rotating said valve element including a cylindrical ring rotatably journalled upon said casing, said casing having a transversely arranged arcuate slot therethrough, and a radial pin joined at one end to said ring loosely mounted within said slot and at its other end joined to said valve element, said ring being adapted to position said valve element for closing off all flow through said casing and movable alternately to other positions on opposite sides of said closed position for establishing a flow of a fluid and chemical mixture to said outlet or a flow of fluid only thereto.

22. The mixing nozzle and valve of claim 1, said venturi passages at one end being slightly larger in diameter than the meeting ends of said conduits, and being of progressively increasing diameter towards their other ends, said venturi passages terminating in a fluid and chemical mixing chamber adjacent the end of said valve element, said venturi passages converging towards each other, one venturi delivering aerated water and the other a mixture of water and chemical to thereby produce a turbulent condition in the mixing chamber and providing a homogeneous mixture at said outlet.

References Cited in the file of this patent

UNITED STATES PATENTS

| | | |
|---|---|---|
| 2,671,691 | Schnell | Mar. 9, 1954 |
| 2,690,717 | Goodrie | Oct. 5, 1954 |